(12) United States Patent
Jayakumar et al.

(10) Patent No.: US 12,399,780 B2
(45) Date of Patent: Aug. 26, 2025

(54) FIRMWARE FIRST HANDLING OF A MACHINE CHECK EVENT

(71) Applicant: Intel Corporation, Santa Clara, CA (US)

(72) Inventors: Sarathy Jayakumar, Portland, OR (US); Eswar Konduru, Hillsboro, OR (US); John Holm, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 17/711,465

(22) Filed: Apr. 1, 2022

(65) Prior Publication Data

US 2023/0315575 A1    Oct. 5, 2023

(51) Int. Cl.
*G06F 11/00* (2006.01)
*G06F 11/07* (2006.01)
*G06F 11/14* (2006.01)
*G06F 21/57* (2013.01)

(52) U.S. Cl.
CPC ...... *G06F 11/1415* (2013.01); *G06F 11/0772* (2013.01); *G06F 11/0784* (2013.01); *G06F 21/575* (2013.01); *G06F 2221/033* (2013.01)

(58) Field of Classification Search
CPC ............ G06F 11/1415; G06F 11/0772; G06F 11/0784; G06F 11/142; G06F 21/575
See application file for complete search history.

(56) References Cited

U.S. PATENT DOCUMENTS

| | | | |
|---|---|---|---|
| 6,622,260 B1 * | 9/2003 | Marisetty | G06F 11/0724 714/10 |
| 9,141,454 B2 | 9/2015 | Raj et al. | |
| 10,824,496 B2 | 11/2020 | Panda et al. | |
| 10,929,232 B2 | 2/2021 | Panda et al. | |
| 2003/0074601 A1 * | 4/2003 | Schultz | G06F 11/0706 714/E11.159 |
| 2007/0061634 A1 | 3/2007 | Marisetty et al. | |
| 2011/0179311 A1 | 7/2011 | Nachimuthu et al. | |
| 2018/0150345 A1 * | 5/2018 | Porwal | G06F 11/0724 |
| 2019/0227965 A1 | 7/2019 | Jayakumar | |
| 2019/0303230 A1 * | 10/2019 | Liberty | G06F 9/30098 |

OTHER PUBLICATIONS

Dixit, Harish Dattatraya et al., Optimizing Interrupt Handling Performance for Memory Failures in Large Scale Data Centers, 2020, ACM (Year: 2020).*

* cited by examiner

*Primary Examiner* — Marc Duncan
(74) *Attorney, Agent, or Firm* — Essential Patents Group, LLP

(57) ABSTRACT

Techniques and mechanisms for supporting machine check functionality with a handler which is implemented in firmware. In an embodiment, a processor executes first firmware code to implement a machine check event (MCE) detector. The MCE detector detects a hardware error of a platform which includes the processor, and generates a call to invoke an MCE handler which the processor implements by executing second firmware code. The MCE handler is called, outside of a software context, to attempt a recovery from the hardware error. The call is performed independent of any system management interrupt being based on the detected hardware error. In another embodiment, another MCE handler of an operating system is conditionally invoked where it is determined that the attempted recovery by the first MCE handler was unsuccessful.

20 Claims, 13 Drawing Sheets

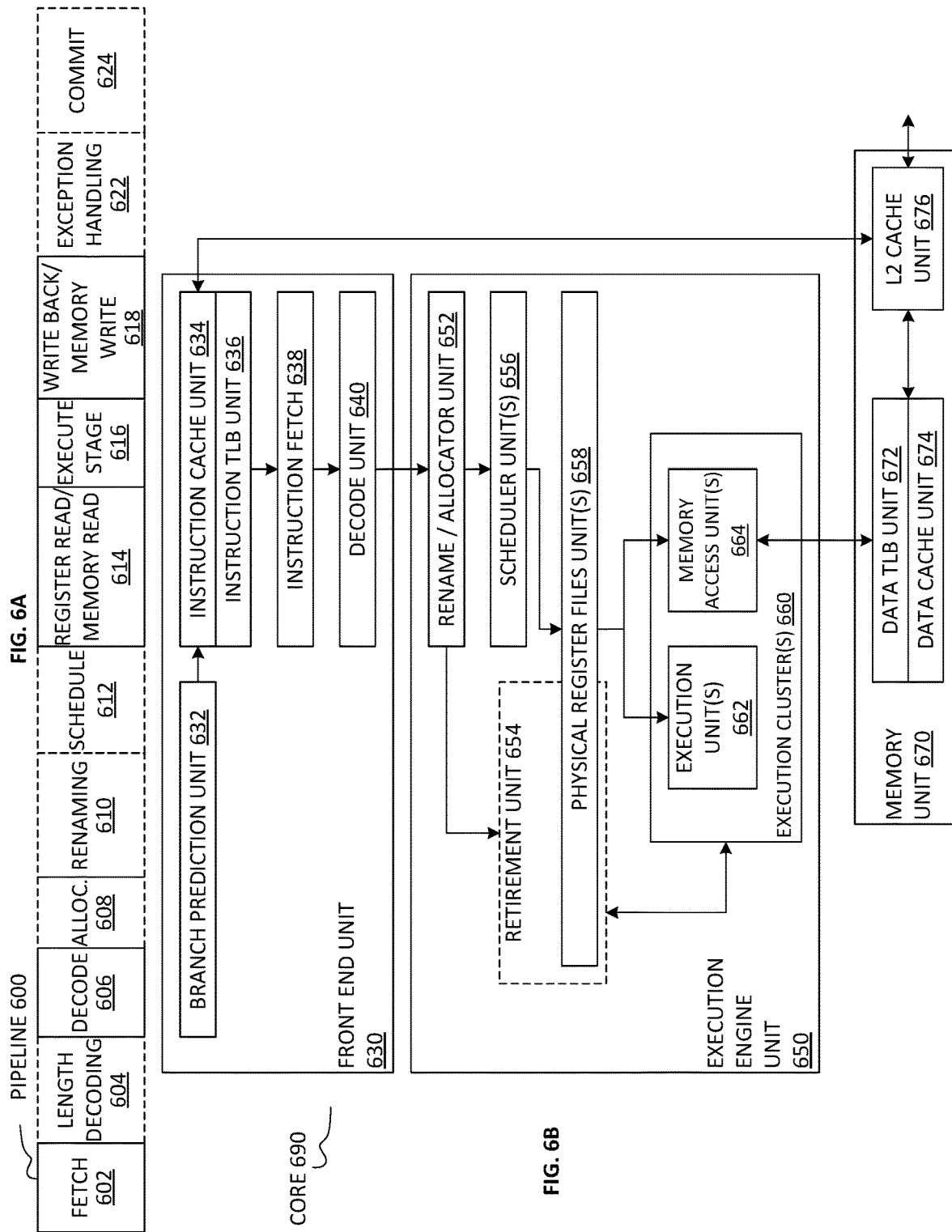

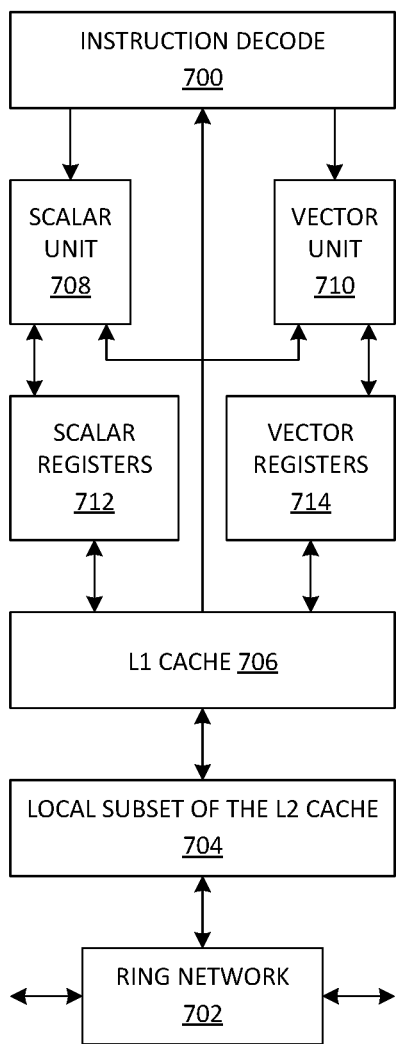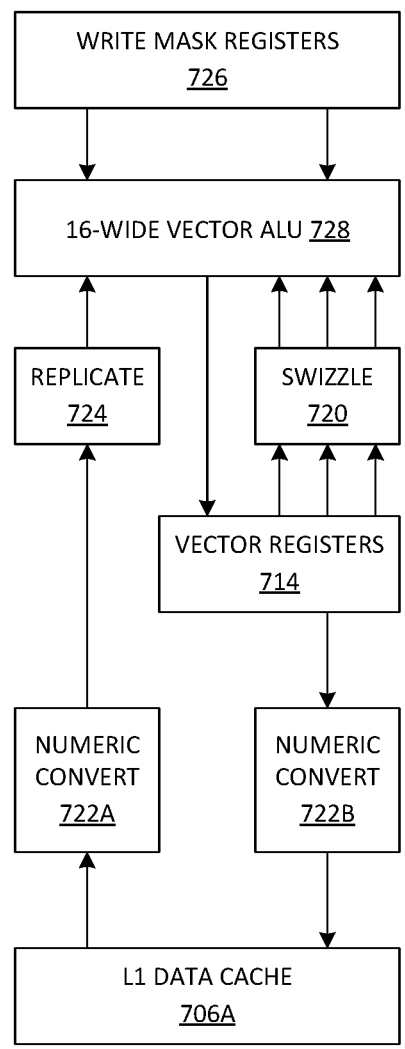
FIG. 7A
FIG. 7B

FIRMWARE FIRST HANDLING OF A MACHINE CHECK EVENT

BACKGROUND

1. Technical Field

This disclosure generally relates to processor operations and more particularly, but not exclusively, to the use of firmware to handle a hardware error event.

2. Background Art

RAS (Reliability, Availability & Serviceability) is a critical requirement for enterprise class servers. System uptime is measured against the goal of "five nines", which represents 99.999% availability. The handling of soft errors to achieve this RAS goal is accomplished by addressing several different aspects of hardware and system software design, such as circuit and logic design, platform, firmware, and operating system (OS) design. A common approach is typically directed towards an attempt to minimize the occurrence of the soft errors at the hardware level within the practical constraints of device physics and logic/system design trade-offs. Automatic detection and correction of errors in hardware are the most preferred methods.

The occurrence of soft errors cannot be completely eliminated by good circuit design techniques, and at times, circuit design innovations are limited by practical bounds. In such cases, the most effective way to combat soft errors is to protect the processor internal structures, the memory subsystem, system bus, and input/output (I/O) fabric using various error protection, detection and correction techniques. Some of the most commonly used hardware techniques are through parity, error correction code (ECC), or cyclical redundancy check (CRC) protection schemes. When the detected software errors cannot be corrected by hardware through the above protection schemes, the responsibility of handling these errors is left to the system software with error log information provided by the underlying software layers. System hardware does not rely on software to correct the errors, but to take necessary corrective action from a software perspective (e.g., system reset, application termination, etc.)

Hardware error handling in most operating systems is a complex process today. The OS contains intelligence to parse some generic hardware error information based on standardized architecture registers or model specific registers (MSRs), classify the errors, and determine actions. However, the OS does not have detailed knowledge of the platform hardware topology and its register space, which would vary across different OEMs (original equipment manufacturers). Standardizing the platform hardware error registers is a possible solution. However, this solution requires both platform and processor hardware changes, and limits scalability, not to mention constant OS changes to support new platform capabilities that tend to evolve over time.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to an embodiment.

FIG. 6B is a block diagram illustrating both an exemplary embodiment of an in-order architecture core and an exemplary register renaming, out-of-order issue/execution architecture core to be included in a processor according to an embodiment.

FIGS. 7A through 7B illustrate a block diagram of a more specific exemplary in-order core architecture, which core would be one of several logic blocks (including other cores of the same type and/or different types) in a chip.

DETAILED DESCRIPTION

Figure 1:
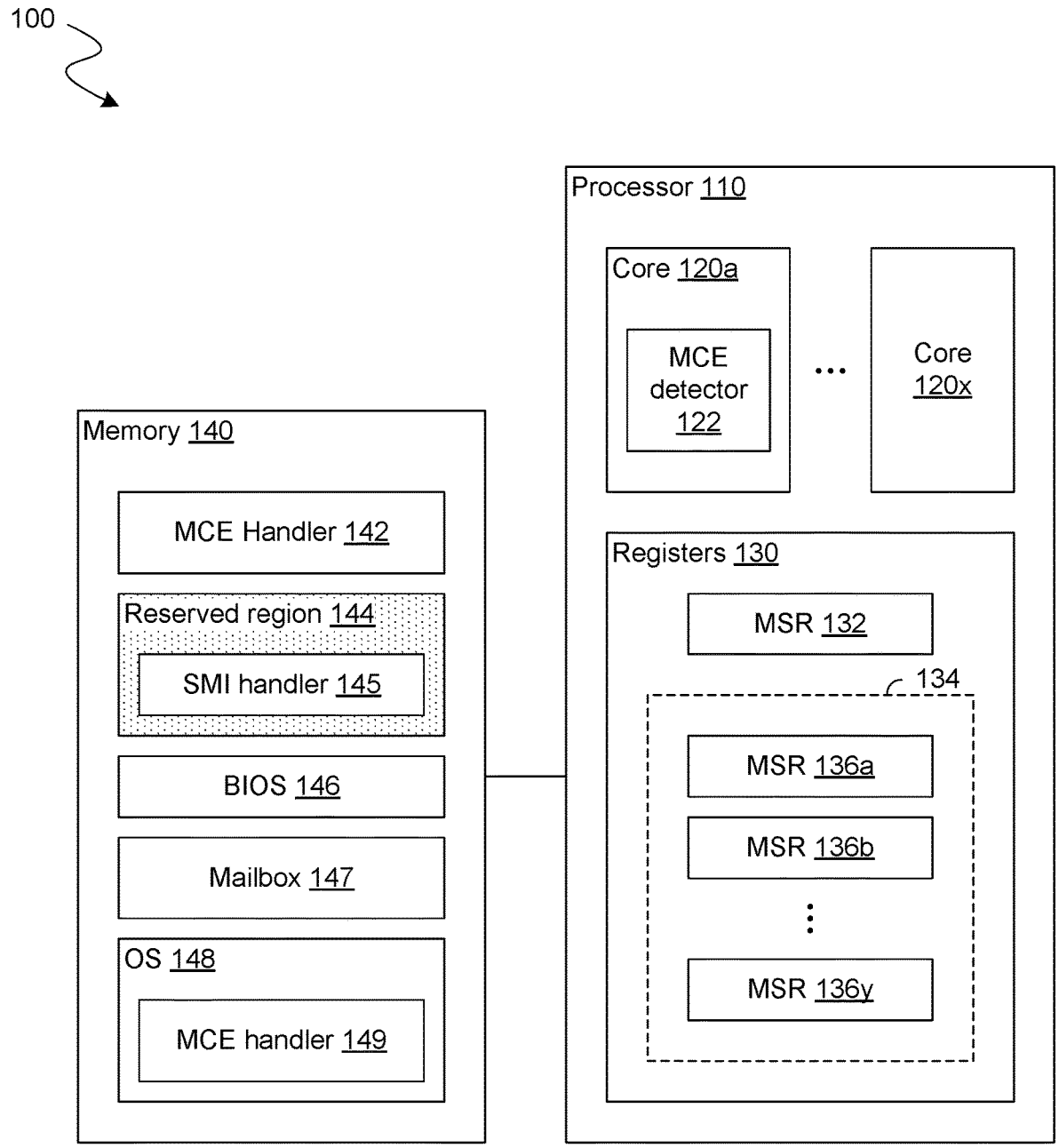
FIG. 1 shows a functional block diagram illustrating features of a device to handle a machine check event according to an embodiment.

Embodiments discussed herein variously provide techniques and mechanisms for supporting machine check functionality with a handler in firmware. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which is configured to provide functionality of a machine check event handler in firmware.

In this description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Enhanced machine check architecture (MCA)—or "eMCA"—is one example of an existing technology which contributes to the RAS (reliability, availability, scalability) for many server class systems. In this technology, a machine check event (MCE) detected by a processor is morphed into a system management interrupt (SMI), which is used to enable system firmware (e.g., a basic input output system, or "BIOS") to gather a rich set of error information—including identifying a field replaceable unit (FRU)—and handle the event. On a resume from the SMI, the machine check event can be presented to the operating system (OS), if the BIOS so decides.

One complication with these existing technologies is their reliance on a SMI—such as a machine check SMI (MSMI), or a correctable machine check (CSMI) signal—to invoke firmware. This type of SMI signaling variously broadcasts of an interrupt which stops or otherwise stalls all cores of a processor and/or all threads on a given core. Such a dependence on SMI signaling does not scale with core count, and tends to result in a race condition. As a result, there is an increasing value placed on solutions which avoid or otherwise mitigate the various unpredictable performance jitters and security concerns which are associated with the use of SMIs.

Some embodiments variously improve upon or replace existing techniques by providing functionality to invoke an MCE handler in firmware without the use of a SMI. For example, various embodiments provide processor microcode which is configured to call an MCE handler in firmware—i.e., rather than communicating a SMI—based on the detection of a hardware error. This MCE handler is provided (for example) by the BIOS, and—in some embodiments—facilitates a return from the MCE handler to the processor microcode. In one such embodiment, the return from the MCE handler results in the processor microcode determining whether another MCE handler of the OS is to be invoked based on the MCE in question.

As used herein, "firmware first handler," "firmware first handling" and related terms variously refer to the characteristic of a handler, which is implemented in firmware, being called—based on an event (such as a machine check event)—prior to any subsequent call to, or other invocation of, another handler of an OS based on the same event. Unless otherwise indicated herein, it is to be understood that a firmware first handler is a machine check event (MCE) handler that is called based on the detection of a hardware error. In an embodiment a call to a firmware first handler is generated at a hardware or firmware level, but outside of the context of the host OS, or of any software process which runs on the host OS. Additionally or alternatively, a call to a firmware first handler is generated independent of any SMI—e.g., wherein the firmware first handler is a single threaded process of a core and, for example, operates while one or more threads of that core (or of any other core) continues uninterrupted.

In accordance with aspects of embodiments described herein, a given processor core supports error handling in response to any of various types of machine events. Such error handling is provided, in part, through the use of facilities that enable various services related to machine check events—such as MCE recovery and/or MCE logging—to be performed by platform firmware in a manner that, for example, is transparent to (i.e., hidden from) an operating system running on a platform. In some embodiments, additional error handling is subsequently performed by the OS using a firmware interface that enables information gathered by a firmware error handler service to be passed to the OS. Some embodiments variously adapt existing types of MCE-related hardware and architecture of a processor—e.g., to provide a flexible and scalable solution via firmware resources. Some embodiments are also implemented to maintain backward compatibility with legacy architectures (e.g., the Intel x86 MCA (machine check architecture) architecture) and enables the new capability of firmware-based platform MCE handling through simple changes to some existing platform error signaling mechanisms and/or firmware interface mechanisms.

In various embodiments, a processor hardware error event results in a call to a first MCE handler which is implemented with firmware, where a return from the MCE handler results in other processor microcode determining whether a second MCE handler in software (e.g., an MCE handler of the OS) is to be invoked. By way of illustration and not limitation, the first MCE handler retrieves or otherwise accesses error information from one or more architectural processor resources, such as model specific registers (MSRs)—e.g., by directly accessing those resources. Some or all such error information is made available to the second MCE handler—e.g., using a shared memory region-based mailbox and/or any of various other suitable mechanisms which provide similar functionality.

FIG. 1 shows features of a device 100 to handle a machine check event according to an embodiment. The device 100 illustrates one example of an embodiment which provides an MCE handler with firmware, wherein the MCE handler is to be invoked—e.g., outside of the context of an operating system—for handling a hardware error event independent of the generation of any system management interrupt.

As shown in FIG. 1, device 100 comprises a processor 110 and a memory 140 coupled thereto. In some embodiments, processor 110 comprises an I/O controller, one or more buses and/or other suitable circuitry by which cores 120a, . . . , 120x of processor 110 are to access memory 140. For example, processor 110 includes (or alternatively, accommodates coupling to) a multi-drop bus, a point-to-point interconnect, a serial interconnect, a parallel bus, a coherent (e.g., cache coherent) bus, a layered protocol architecture, a differential bus and/or any of various other suitable interconnect mechanisms.

Processor 110 includes any of various suitable processing devices, such as a central processing unit (CPU), a microprocessor, an embedded processor, a digital signal processor (DSP), a network processor, a handheld processor, an application processor, a co-processor, or other device to execute code. Processor 110, in one embodiment, includes at two or more central, host, or processing cores—such as the illustrative cores 120a, . . . , 120x shown—which (for example) include asymmetric cores and/or symmetric cores. In various embodiments, device 100 includes any suitable number of one or more processing elements that are symmetric or, alternatively, asymmetric.

A given one of cores 120a, . . . , 120x comprises a processing element including hardware and/or other logic to support a software thread. In various embodiments, such a processing element is that of a graphics processor, a network controller, an embedded processor, microcontroller, and/or the like. Here, cores 120a, . . . , 120x are considered symmetric cores, i.e., cores with the same configurations, functional units, and/or logic. In another embodiment, one of cores 120a, . . . , 120x includes an out-of-order processor core, while another of cores 120a, . . . , 120x includes an in-order processor core. However, in various embodiments, cores 120a, . . . , 120x are adapted from any of various types of cores, such as a native core, a software managed core, a core adapted to execute a native Instruction Set Architecture (ISA), a core adapted to execute a translated Instruction Set Architecture (ISA), a co-designed core, or other known core.

Memory 140 is dedicated to processor 110 or, alternatively, shared with other components of device 100. Some examples of types of memory 140 include dynamic random-access memory (DRAM), static RAM (SRAM), non-volatile memory (NV memory), and other suitable storage devices. Memory 140 represents any of various suitable arrangements of one or more memory resources which are to function at least in part as a repository of instructions which are to be variously executed each with a respective one of cores 120a, . . . , 120x. For example, memory 140 comprises one or more memory devices which are configured to accommodate the loading of an operating system OS 148 (for example) which is executed by the processor 110. For example, OS 148 comprises an operating system known in the art, such as a Microsoft® Windows® operating system, Linux™, etc. (Microsoft and Windows are registered trademarks of Microsoft Corporation and Linux is a trademark of Linus Torvalds). In some embodiments, memory 140 is further to serve as a repository of state for one or more other software applications (not shown)—e.g., including application code and data structures thereof—which are to execute under the OS 148 (or another operating system). In certain embodiments, the one or more other software applications include device drivers loaded in a kernel space of the OS 148.

In some embodiments, during a boot or other initialization of device 100, a BIOS 146 configures a reserved (or "sequestered") memory region 144 that is inaccessible to processes controlled by the OS 148. In one such embodiment, reserved memory region 144 receives sequestered code which is loaded into the reserved memory region 144—e.g., by the BIOS 146 during the boot sequence—and is inaccessible to processes operating under the OS 148. This sequestered code comprises code associated with the reserved memory region 144 and comprises (for example) special firmware code that is to be executed in a special operating mode, i.e., sequestered mode, of the processor platform in which the processor 110 process has access to reserved memory region 144. In other words, this sequestered operating mode of the platform provides an isolated environment independent of the host OS 148.

For example, in certain embodiments, the processor 110 executes a special interrupt, which is recognized by the processor 110 platform and causes the processor 110 to save the processor 110 state information and enter the sequestered mode to execute sequestered code which has been loaded by the BIOS 146 in the reserved memory region 144. Upon processing the special interrupt, the processor 110 executes one or more handlers with the sequestered code to perform various system management operations.

By way of illustration and not limitation, such sequestered code comprises System Management Mode (SMM) code included in Intel Corporation's ("Intel") processor architecture. On Intel architectures, the sequestered operating mode is referred to as System Management Mode (SMM) and the special interrupt to invoke the SMM is referred to as a System Management Interrupt (SMI). Further details of one such SMM mode are described, for example, in the publication from Intel entitled "Intel Architecture Software Developer's Manual, Volume 3: System Programming" (Copyright Intel, 1999). In additional embodiments, the sequestered mode, sequestered code, and special interrupt may be implemented in processor architectures from different processor vendors. In the illustrative embodiment shown, a SMI handler 145 is loaded into reserved region 144 by BIOS 146—e.g., wherein SMI handler 145 is to be executed as firmware for handling an interrupt. In other embodiments, memory 140 omits reserved region 144 (or at least the SMI handler 145, for example).

In an illustrative scenario according to one embodiment, some or all of cores 120*a*, . . . , 120*x* each comprise, or otherwise have associated therewith, a respective machine check event (MCE) detector—such as the illustrative MCE detector 122 of core 120*a*—which is to detect a machine check exception, machine check error and/or other such machine check event. By way of illustration and not limitation, MCE detector 122 is provided at a hardware level and/or with firmware by core 120*a*—e.g., wherein MCE detector 122 is implemented outside of the context of any host OS (or other software process) executed by core 120*a*.

In response to the detecting of a hardware error, MCE detector 122 makes a far call to an MCE handler 142—a "firmware first" handler—which is loaded into memory 140 and (for example) is to be executed as firmware by core 120*a*. In an embodiment, MCE detector 122 makes the call to MCE handler 142 in lieu of generating a SMI such as one which is to be handled by SMI handler 145. In one embodiment, MCE handler 142 is specific to the particular type or class of processor 110—e.g., providing functionality to interpret and respond to the machine check encodings generated for that processor type or class (although other embodiments are not limited in this regard). Additionally or alternatively, MCE handler 142 provides functionality to handle any of various different types of machine check events—e.g., wherein the MCE handler 142 includes several different types of firmware-implemented handlers for responding to different types of MC errors. In some examples herein, the MCE handler 142 corresponds to at least one of a machine-check exception handler or a corrected machine-check interrupt handler.

In an illustrative scenario according to one embodiment, MCE handler 142 comprises firmware to recover from uncorrected recoverable machine check errors. This enables core 120*a* to perform one or more recovery actions on a certain class of uncorrected errors—e.g., without the need for a SMI which would otherwise interrupt thread execution by one or more of cores 120*a*, . . . , 120*x*. In some embodiments, when MCE handler 142 is able to provide MCE recovery, such recovery is performed without any call or other invocation of, a software MCE handler 149 which is included in (or executed on) OS 148. On the other hand, when MCE handler 142 fails to recover from a given MCE, then—in some embodiments—a return from MCE handler 142 includes or is otherwise associated with the provisioning of a signal that MCE handler 149 is to be invoked based on that given MCE.

In various embodiments, MCE recovery operations and/or MCE logging operations by MCE handler 142 include, or are otherwise based on, the accessing of one or more registers of processor 110, such as the illustrative registers 130 shown. By way of illustration and not limitation, registers 130 comprises a model specific register (MSR) 132 which is to provide an address, pointer or other suitable information which is suitable to identify—e.g., to MCE detector 122—a location where MCE handler 142 is to be accessed in memory 140. In one such embodiment, such information is loaded into MSR 132 by the BIOS 146 during a boot sequence of device 100.

Additionally or alternatively, registers 130 further comprises MSRs 134 (e.g., including the illustrative MSRs 136*a*, 136*b*, . . . , 136*y* shown) which determine whether and/or how information—which describes one or more characteristics of a particular MCE—is to be reported by MCE handler 142 to OS 148 and/or other resources of device 100. By way of illustration and not limitation, MSRs 134 comprise a control register (Ctl Reg) which is to control error reporting for machine check errors which are produced by a particular hardware unit or group of hardware units. Additionally or alternatively, MSRs 134 comprise an address register (Addr Reg) which is to provide the address of the code or data memory location that produced a particular machine check error. In some embodiments, MSRs 134 additionally or alternatively comprise a miscellaneous register (Misc Reg) which is to provide additional information describing a given machine check error—e.g., to support software recovery of an uncorrected error. Additionally or alternatively, MSRs 134 comprise a status register (Status Reg) which is to provide information related to a machine check error if its VAL (valid) flag is set. For example, the status register (Status Reg) is to indicate an error code that specifies an MCA-defined error code for a particular machine check error condition that is detected. In some embodiments, MSRs 134 are to provide any of various additional or alternative types of information which facilitate the reporting of an MCE recovery and/or an MCE log—e.g., wherein such information is adapted from conventional MCE handling techniques.

In various embodiments, processor 110 provides both internal and external machine check mechanisms, such as for checking the operation of internal chip hardware and bus transactions. When a hardware error is detected, MCE detector 122 makes a call for MCE handler 142—e.g., to signal an MCE as a vector, and to return an error code. Accordingly, when a machine check error occurs, valid error data for the error is stored by MCE handler 142 into a particular error reporting register of registers 130—e.g., without MCE detector 122 or MCE handler 142 broadcasting any interrupt to the various cores 120a, . . . , 120x of processor 110. Responsive to MCE detector 122, MCE handler 142 accesses registers 130 to determine one or more characteristics of the MCE, and (in some embodiments) to recover from the MCE and/or generate a log report of the MCE.

In an illustrative scenario according to one embodiment, an uncorrected recoverable (UCR) error comprises an uncorrected error that has been detected and signaled, but which has not corrupted some (or any) context of processor 110. Based on a detection of said UCR, MCE detector 122 generates a call to MCE handler 142—e.g., using the location of MCE handler 142 which is identified in MSR 132. MCE handler 142 provides functionality to access registers 130 (e.g., including one or more of MSRs 134)—e.g., to analyze and implement specific error recovery actions for UCR (or other) errors. In some embodiments, MCE handler 142 further includes the capability to log valid error data in registers 130—e.g., in one of the MSRs 134 thereof—or in any of various other suitable resources of processor 110.

In some embodiments, MCE handler 142 generates a report comprising MCE-related information which is based on an accessing of some or all MSRs 134. In one such embodiment, MCE handler 142 stores the report to a mailbox 147 in memory 140—e.g., wherein OS 148 (and/or other logic of processor 110) may access mailbox 147 after a return from the execution of MCE handler 142.

Figure 2:
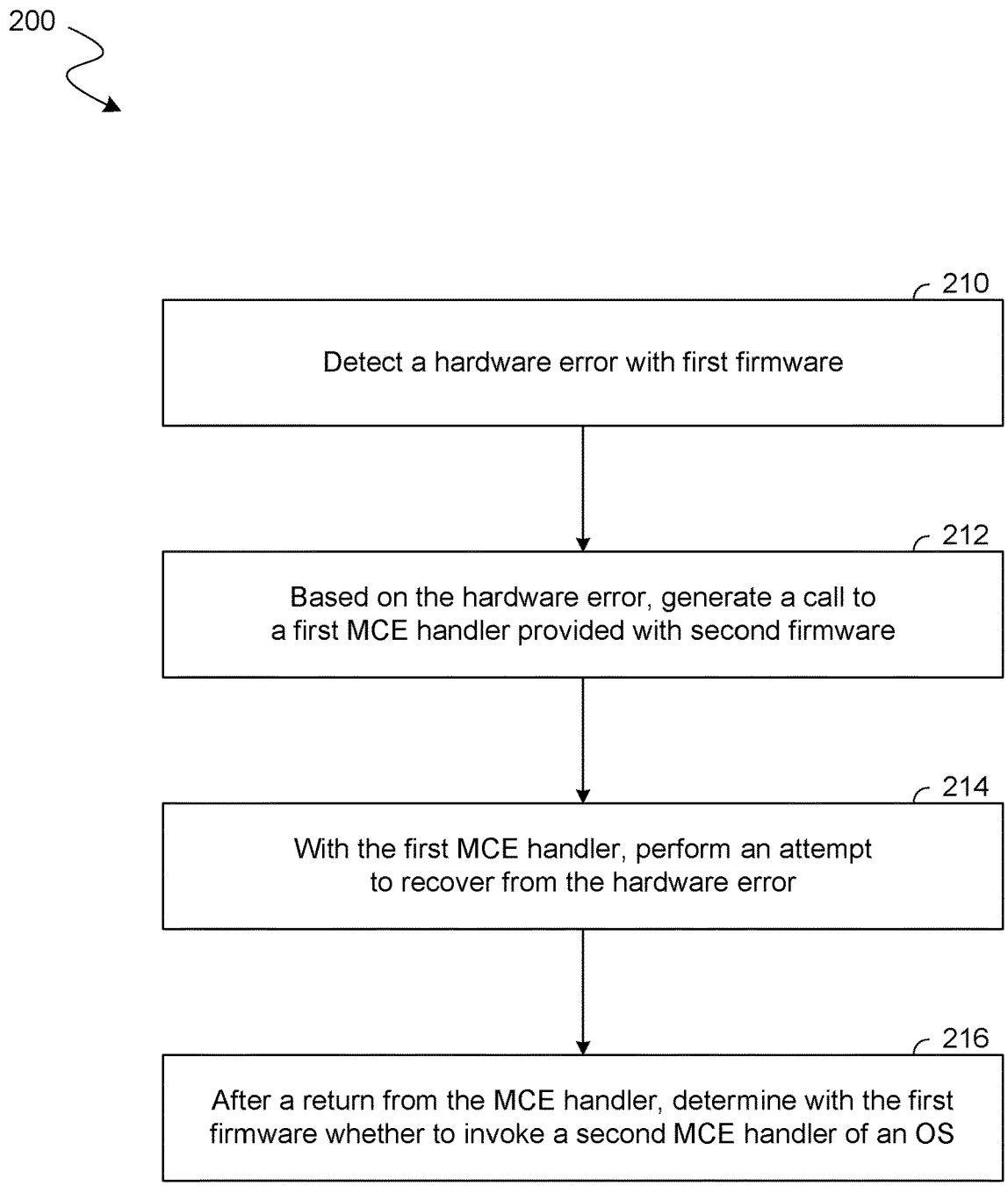
FIG. 2 shows a flow diagram illustrating features of a method to access firmware to handle a machine check event according to an embodiment.

FIG. 2 shows features of a method 200 to access firmware to handle a machine check event according to an embodiment. Operations such as those of method 200 are performed, for example, with core 120a—e.g., wherein such operations variously include or are otherwise based on a provisioning of MCE detector 122, MCE handler 142, BIOS 146 and/or other suitable logic of device 100.

As shown in FIG. 2, method 200 comprises detecting a hardware error (at 210), wherein the detecting is performed with first firmware code which is being executed at a processor to implement functionality such that of MCE detector 122, for example. In an embodiment, the detecting at 210 comprises receiving a machine check exception or other suitable indicator of a machine check event.

Based on the hardware error detected at 210, method 200 (at 212) generates a call to invoke a first MCE handler which is to be provided with an execution of second firmware code. For example, the first MCE handler provides functionality such as that of MCE handler 142. In one such embodiment, generation of the call at 212 further includes or is otherwise based on the MCE detector accessing first information at an architectural register (e.g., MSR 132) of the processor. The first information comprises an address, pointer or other suitable identifier of a location where the second firmware code has been loaded in a memory (such as memory 140).

By way of illustration and not limitation, method 200 further includes or is otherwise based on additional operations (not shown) wherein system configuration logic—e.g., a BIOS, an interface compatible with a Unified Extensible Firmware Interface standard, or the like—loads the second firmware code to the memory location and stores the first information to the architectural register of the processor. In one such embodiment, this loading and storing takes place at during a boot or other initialization of the platform—e.g., wherein the system configuration logic authenticates the second firmware code (for example, with a Secure Boot feature of a UEFI-compatible interface). In various embodiments the first MCE handler is a single threaded process (and/or a ring 0 process, for example) which is provided by the execution of the second firmware code.

Based on the call generated at 212, method 200 (at 214) executes the second firmware code to provide the first MCE handler, which in turn performs an attempt to recover from the hardware error detected at 210. The MCE detector invokes the first MCE handler, for example, independent of any generation of a system management interrupt which might be based on the hardware error. In some embodiments, the performing at 214 includes the first MCE handler accessing one or more other architectural registers of the processor—e.g., such as MSRs 134—to identify, for example, a type of information to be included in a report of a machine check event. In one such embodiment, the first MCE handler provides the report to a mailbox region of the memory.

After a return from the MCE handler—e.g., after a return from an execution of the second firmware code to a resumed execution of the first firmware code—method 200 (at 216) determines whether or not a second MCE handler of an operating system is to be invoked. For example, the first MCE handler further generates second information which indicates whether the attempt was successful—e.g., wherein the second information is provided in an MCE log report, in a flag bit of an MSR, or in any of various other suitable processor resources which are available to the MCE detector. In one such embodiment, the MCE detector further determines, based on the second information, whether there is any still-pending MCE to be handled by the second MCE handler.

Figure 3:
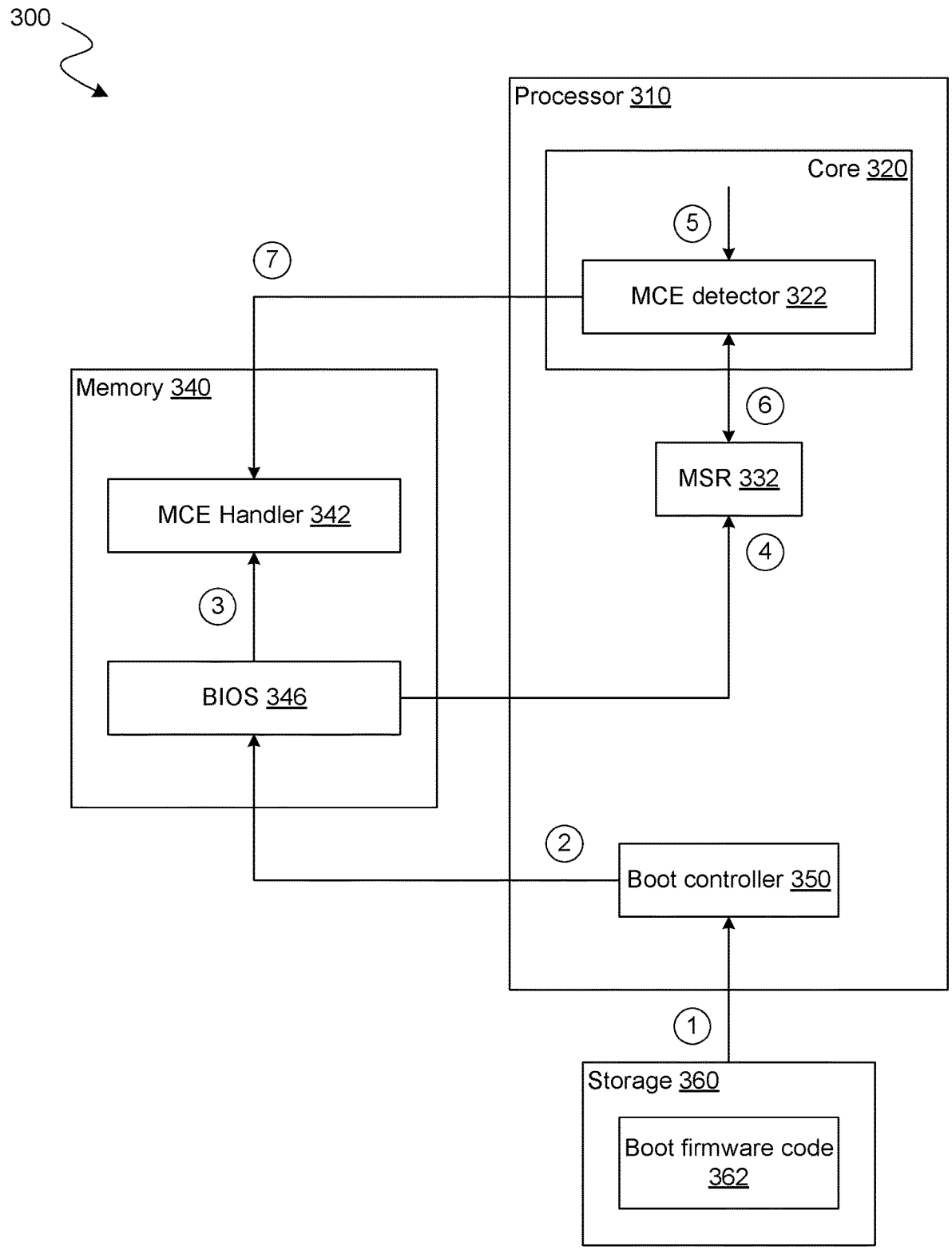
FIG. 3 shows a functional block diagram illustrating features of a system to provide firmware which avoids a system management interrupt in supporting a machine check event according to an embodiment.

FIG. 3 shows features of a system 300 to provide firmware which avoids a system management interrupt in supporting a machine check event according to an embodiment. System 300 illustrates one example embodiment which provides a single threaded MCE handler which executes outside of the context of an operating system, and which is invoked to handle a hardware error independent of any SMI being generated based on said data error. In various embodiments, system 300 provides functionality such as that of device 100—e.g., wherein one or more operations of method 200 are performed with system 300.

As shown in FIG. 3, system 300 comprises a processor 310, and a memory 340 which is coupled thereto. Processor 310 comprises a core 320 which executes or otherwise provides functionality of an MCE detector 322. Furthermore, processor 310 comprises any of various architectural registers including (for example) the illustrative MSR 332 shown. Further still, during operation of system 300, memory 340 stores the respective code and data structures of an MCE handler 342 and BIOS 346. In one such embodiment, core 320, MSR 332, and memory 340 provide functionality of core 120a, MSR 132, and memory 140 (respectively)—e.g., wherein MCE detector 322, MCE handler 342 and BIOS 346 correspond functionally to MCE detector 122, MCE handler 142 and BIOS 146 (respectively).

During bootup operations, a boot controller 350 of processor 310 accesses a storage 360 of system 300—as represented by the operation (1) shown—to retrieve boot firmware code 362. In an embodiment, boot firmware code 362 comprises a header file that identifies a map of what boot code is to be copied by processor 310. For example, a .h file for boot firmware code 362 comprises a flash image layout map of which segments of boot firmware code 362 are to be copied. In the example embodiment shown, boot firmware code 362 comprises BIOS firmware which, for example, is pre-installed in storage 360 (e.g., flash memory or other suitable storage media).

The retrieved boot firmware code 362 is loaded into memory 340—as represented by the operation (2) shown—to enable the execution of a BIOS 346 with core 320. For example, BIOS 346 is executed to perform hardware initialization during a booting process (e.g., power-on startup), and provide runtime services for operating systems and programs. In various embodiments, BIOS 346 is executed to configure or re-configure system software at or after boot.

In an embodiment, BIOS 346 initializes and tests the system hardware components and/or otherwise initializes the execution of an operating system (not shown) with core 320. The OS, in some examples, is one of a Linux®, Windows®, FreeB SD®, Android®, MacOS®, iOS®, or any other operating system. The OS and driver execute on a CPU sold or designed by Intel®, ARM®, AMD®, Qualcomm®, IBM®, Texas Instruments®, among others.

To facilitate machine check recovery and/or logging according to some embodiments, BIOS 346 (or alternatively, boot controller 350) loads MCE handler 342 to another location of memory 340—as represented by the operation (3) shown. In some embodiments, MCE handler 342 is authenticated by BIOS 346 using a Unified Extensible Firmware Interface (UEFI) Secure Boot process or other suitable authentication mechanism. Additionally or alternatively, MCE handler 342 is loaded into memory 340 using a Platform Runtime Mechanism (PRM), for example. In contrast to firmware which is conventionally loaded using Platform Runtime Mechanism techniques, MCE handler 342 is available to be invoked from a hardware level or with firmware—i.e., outside of a software context such as that of a host OS, or of a software process which executes on such a host OS. The location of MCE handler 342 in memory 340 is identified by an address, pointer and/or other suitable information which BIOS 346 writes to MSR 332—as represented by the operation (4) shown.

Subsequently, at some point during operation of system 300, MCE detector 322 receives or otherwise detects a signal—as represented by the operation (5) shown—which indicates a hardware error of system 300 (or, for example, of hardware which is coupled to system 300). The generation and communication of such a signal to MCE detector 322 include one or more operations which, for example, are adapted from conventional platform hardware monitoring techniques. The details of such operations are not limiting on some embodiments and are not detailed herein to avoid obscuring certain features of such embodiments.

In response to the indicated hardware error, MCE detector 322 accesses MSR 332 to identify the location of MCE handler 342 in memory 340—as represented by the operation (6) shown. With the location identifier, MCE detector 322 generates a far call—as represented by the operation (7) shown—to invoke MCE handler 342 (e.g., without system 300 generating any system management interrupt based on the indicated hardware error).

Figure 4:
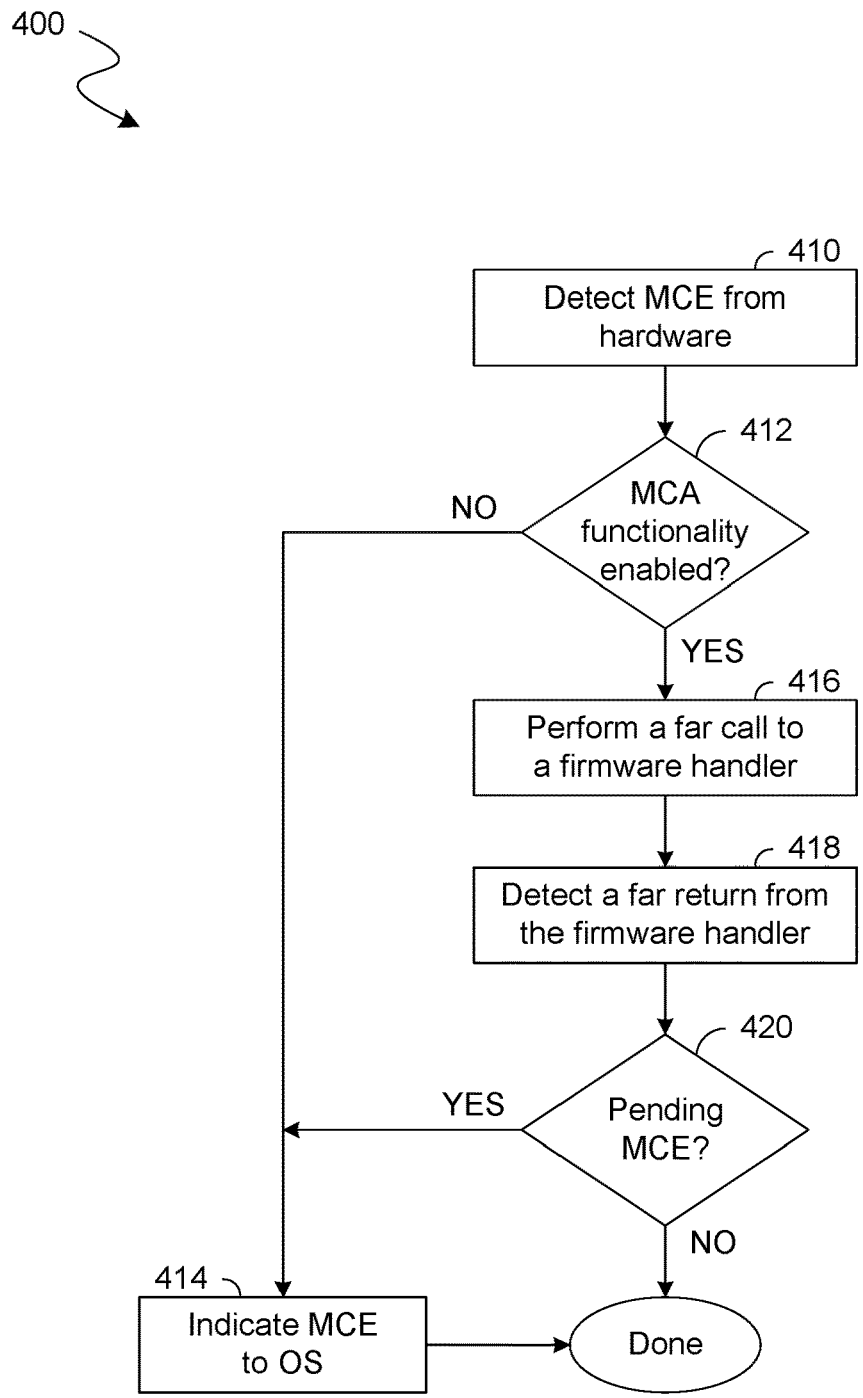
FIG. 4 shows a flow diagram illustrating features of a method to generate a call to firmware in response to a hardware error according to an embodiment.

FIG. 4 shows features of a method 400 to generate a call to firmware in response to a hardware error according to an embodiment. The method 400 illustrates one example of an embodiment wherein processor microcode (e.g., providing functionality of MCE detector 122) facilitates the invocation of an MCE handler in firmware, independent of any generation of a SMI. Operations such as those of method 400 are performed, for example, with MCE detector 122 or MCE detector 322—e.g., wherein method 200 includes or is otherwise based on operations of method 400.

As shown in FIG. 4, method 400 comprises (at 410) detecting a machine check event (MCE) comprising an error of some hardware in a platform which performs method 400. The hardware error event will typically be detected by either a processor—e.g., processor 110—or platform hardware which is coupled to the processor (for example, by the faulty hardware component itself). In either case, an error type is ascertained, and a determination is made as to whether a firmware (F/W) intercept is enabled for the error type.

For example, method 400 further comprises performing an evaluation (at 412) to determine whether machine check architecture (MCA) functionality—and in some embodiments, eMCA, more particularly—is currently enabled at least for a type of the hardware error detected at 410. For example, firmware can be variously configured such that certain predetermined error types are intercepted, while others types are ignored (by the firmware)—e.g., in which case, error handling is instead passed directly to the OS.

Where it is determined at 412 that such MCA functionality is unavailable, method 400 (at 414) indicates to the OS that an MCE is pending—e.g., wherein the MCE is to be handled by MCE handler 149. Where it is instead determined at 412 that the MCA functionality is available, method 400 (at 416) performs a far call to an MCE handler which is implemented with firmware.

Figure 5:
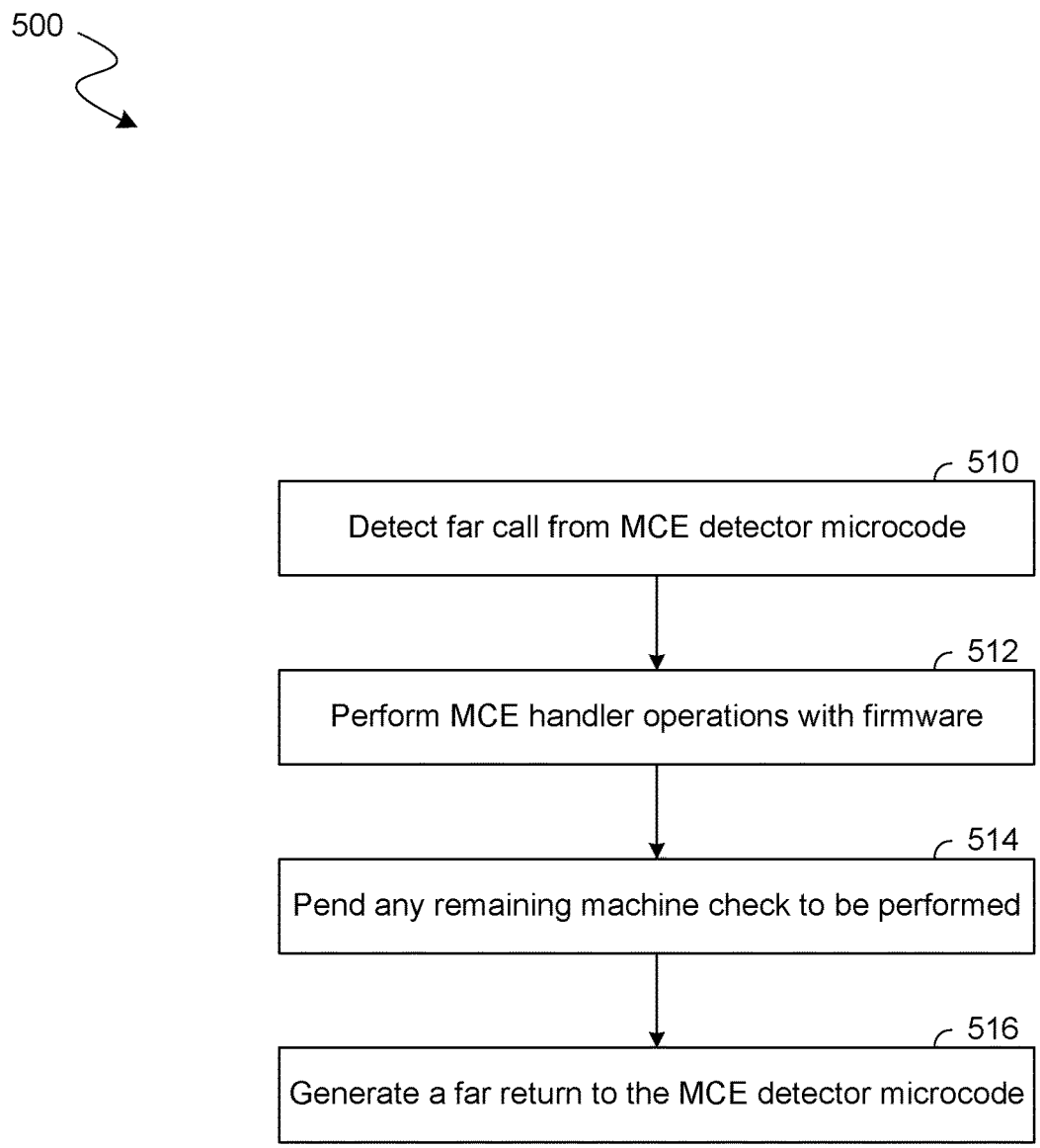
FIG. 5 shows a flow diagram illustrating features of a method to evaluate a hardware error with firmware according to an embodiment.

For example, FIG. 5 shows operations of a method 500 to attempt a recovery from a hardware error with a firmware handler according to an embodiment. Operations such as those of method 500 are performed, for example, with MCE handler 142 or MCE handler 342—e.g., wherein method 500 includes or is otherwise based on method 400.

As shown in FIG. 5, method 500 comprises (at 510) detecting a call—such as the far call performed at 416—from an MCE detector that is implemented with processor microcode. Based on the far call detected at 510, method 500 (at 512) performs MCE handler operations, with an execution of firmware, to attempt a recovery from a hardware error which is specified or otherwise indicated by the call. By way of illustration and not limitation, the performing at 512 comprises collecting from one or more hardware components of the platform information which describes one or more characteristics of the hardware error. Additionally or alternatively, the performing at 512 comprises performing memory migration, mirroring and/or any of various other suitable operations to preserve some platform state. In some embodiments, the performing at 512 additionally or alternatively comprises attempting a restart, reset, roll-back and/or other reinitialization of one or more hardware components. Additionally or alternatively, the performing at 512 comprises gathering diagnostic and/or other analytics information which, for example is to be included in an MCE log report.

Method 500 further comprises (at 514) pending any remaining machine check which is to be performed after the MCE handler operations performed at 514. For example, in one such embodiment, the firmware handler generates information which specifies or otherwise indicates whether a hardware error recovery attempted at 512 was successful. Such information is provided, for example, in an MCE log report, in a flag bit of an MSR, or in any of various other suitable processor resources which are available to an MCE detector (such as one which performs method 400). In an embodiment, method 500 further comprises (at 516) generating a far return to such an MCE detector, wherein the MCE detector is implemented with microcode.

For example, referring again to FIG. 4, method 400 further comprises (at 418) detecting a far return from a firmware MCE handler, such as one with which method 500 is performed. Based on the far return detected at 418, method 400 (at 420) performs an evaluation to determine whether any MCE has been pended by the MCE handler. Where it is determined at 420 that an MCE is still pending, method 400 (at 414) indicates to the OS that said MCE remains to be handled—e.g., by invoking MCE handler 149, for example. Otherwise, method 400 (or at least one iteration thereof) completes without any such invocation of the OS's MCE handler.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers.

The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 706, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
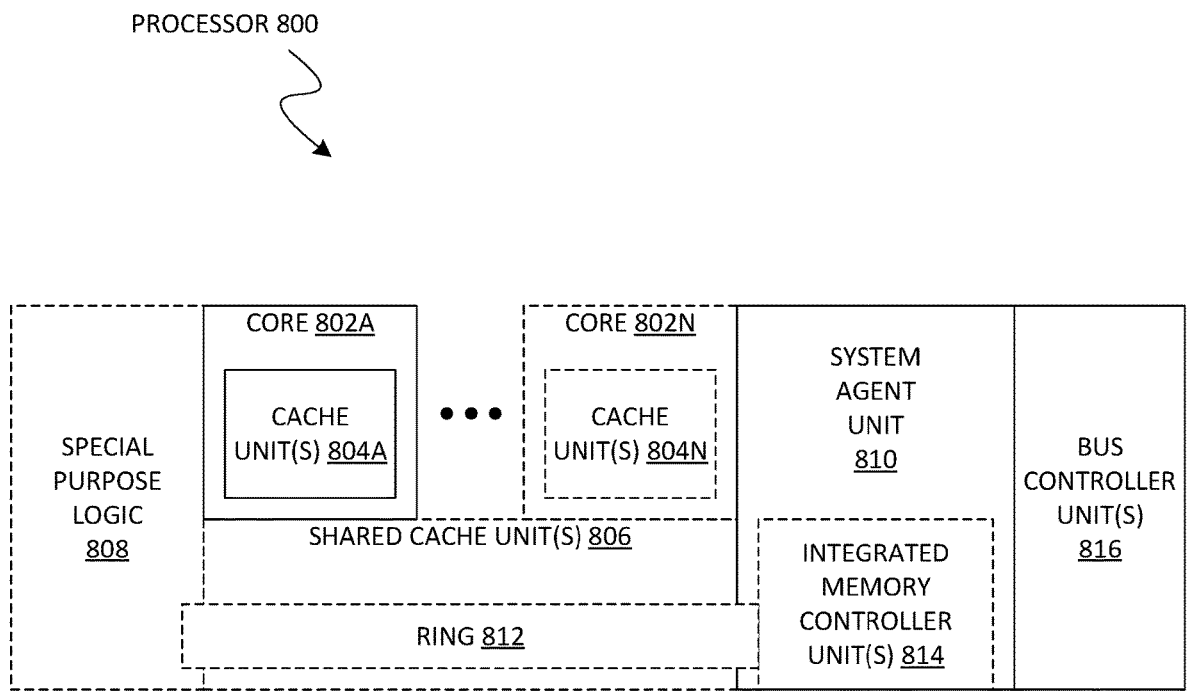
FIG. 8 is a block diagram of a processor that may have more than one core, may have an integrated memory controller, and may have integrated graphics according to an embodiment.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes respective one or more levels of caches 804A-N within cores 802A-N, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9 through 12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
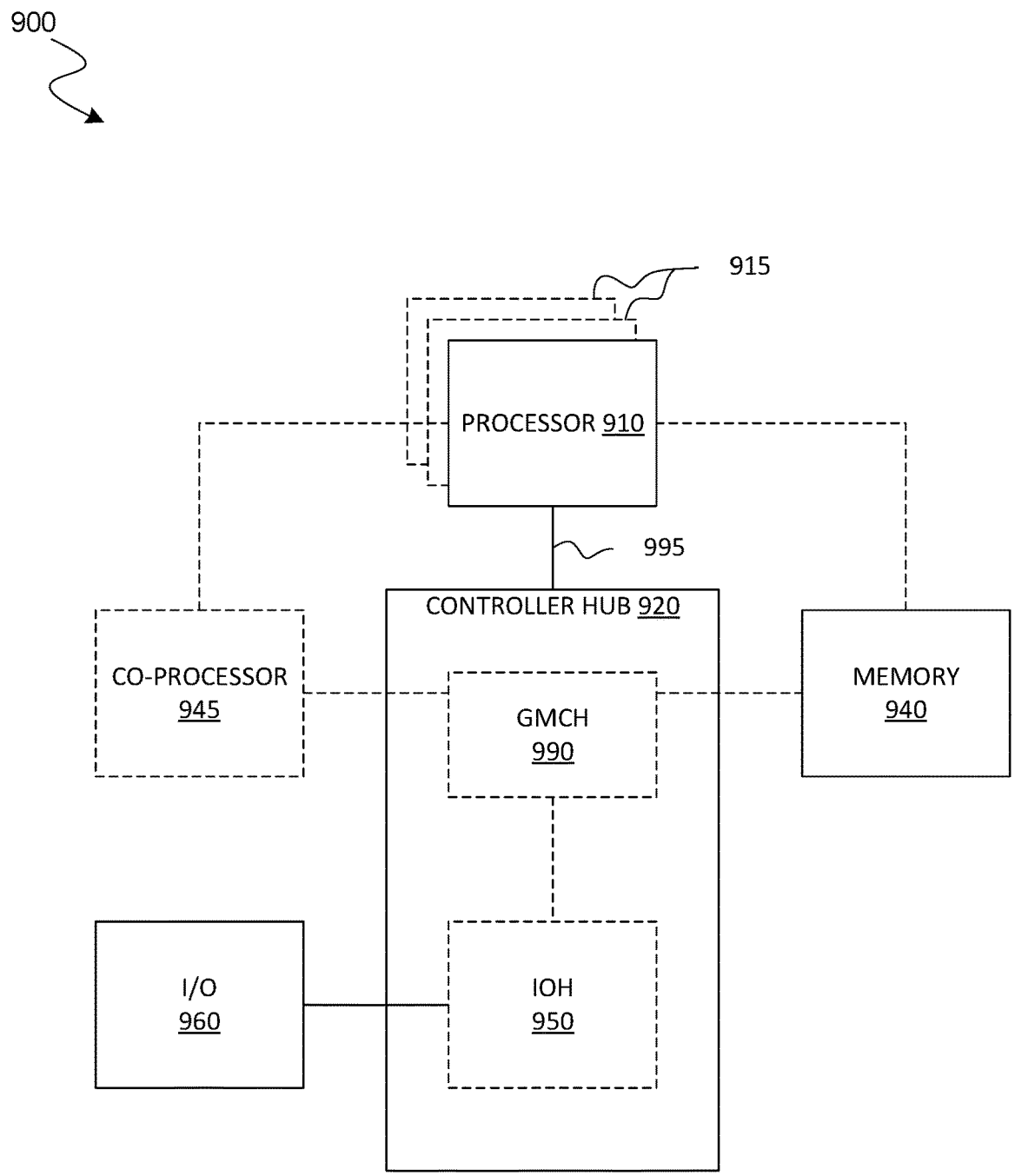
FIGS. 9 through 12 are block diagrams of exemplary computer architectures.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the processors 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
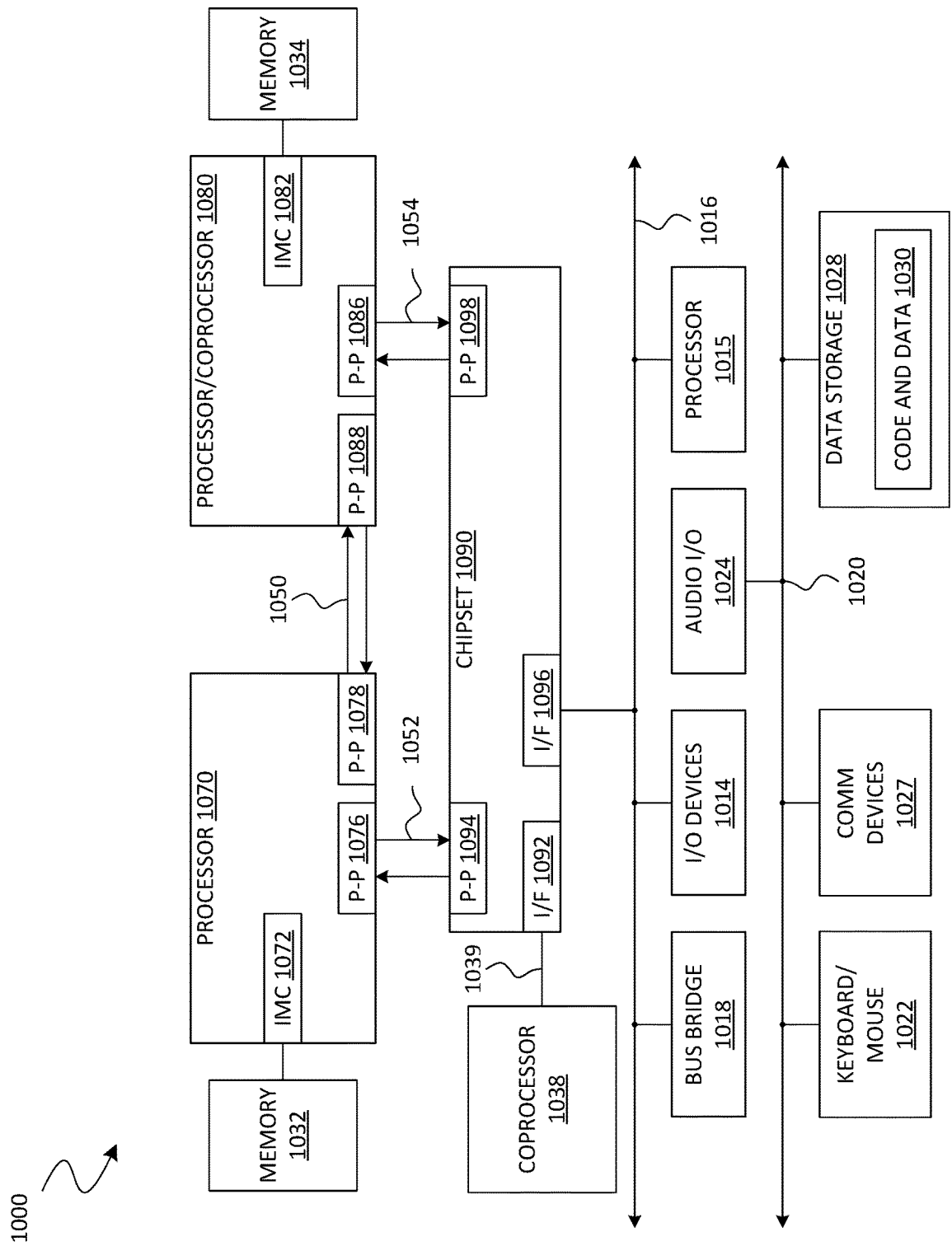

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller unit's point-to-point (P-P) interfaces 1076 and 1078; similarly, second processor 1080 includes P-P interfaces 1086 and 1088. Processors 1070, 1080 may exchange information via a point-to-point (P-P) interconnect 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092 and an interconnect 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
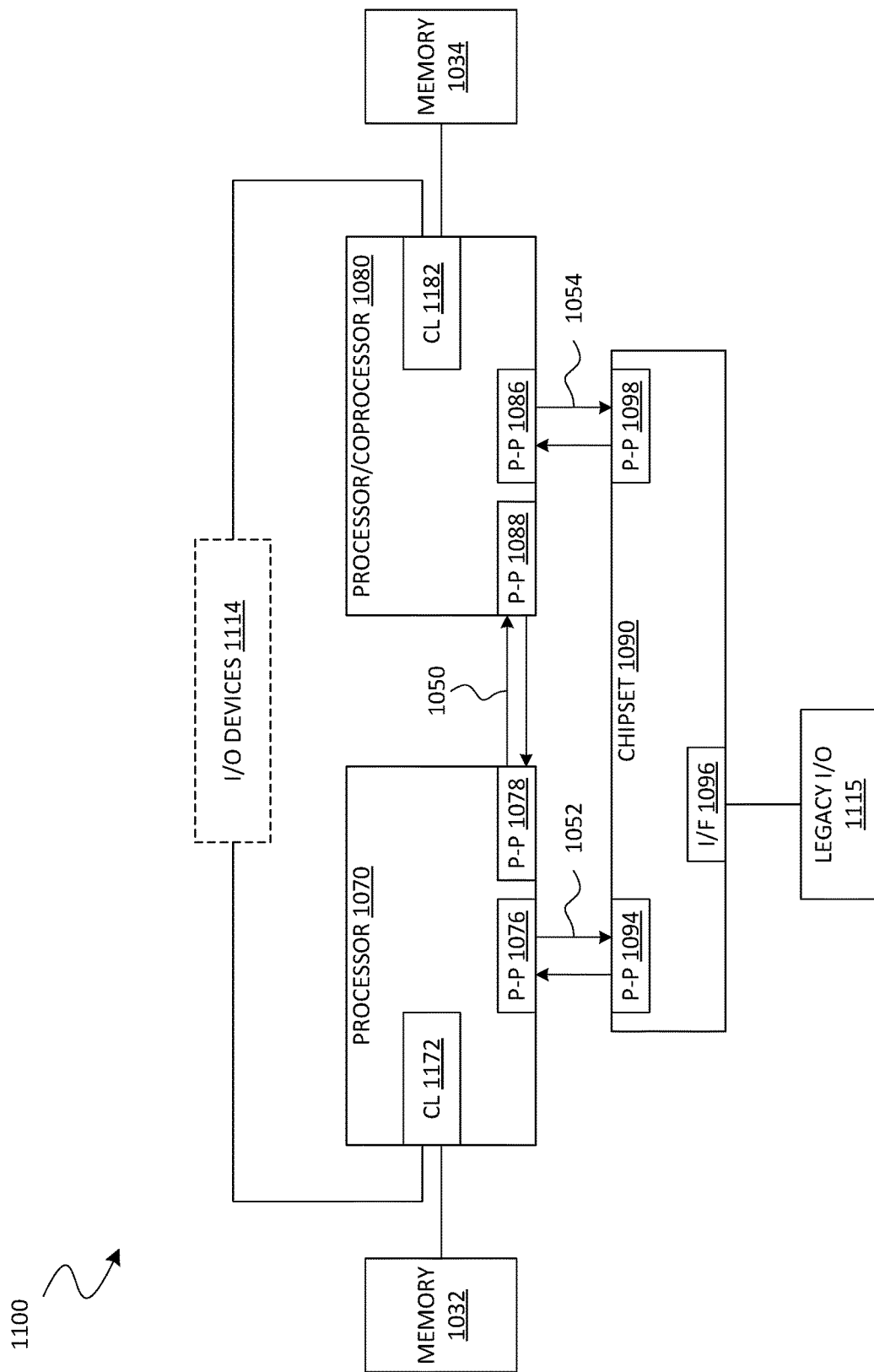

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1172, 1182, but also that I/O devices 1114 are also coupled to the control logic 1172, 1182. Legacy I/O devices 1115 are coupled to the chipset 1090.

Figure 12:
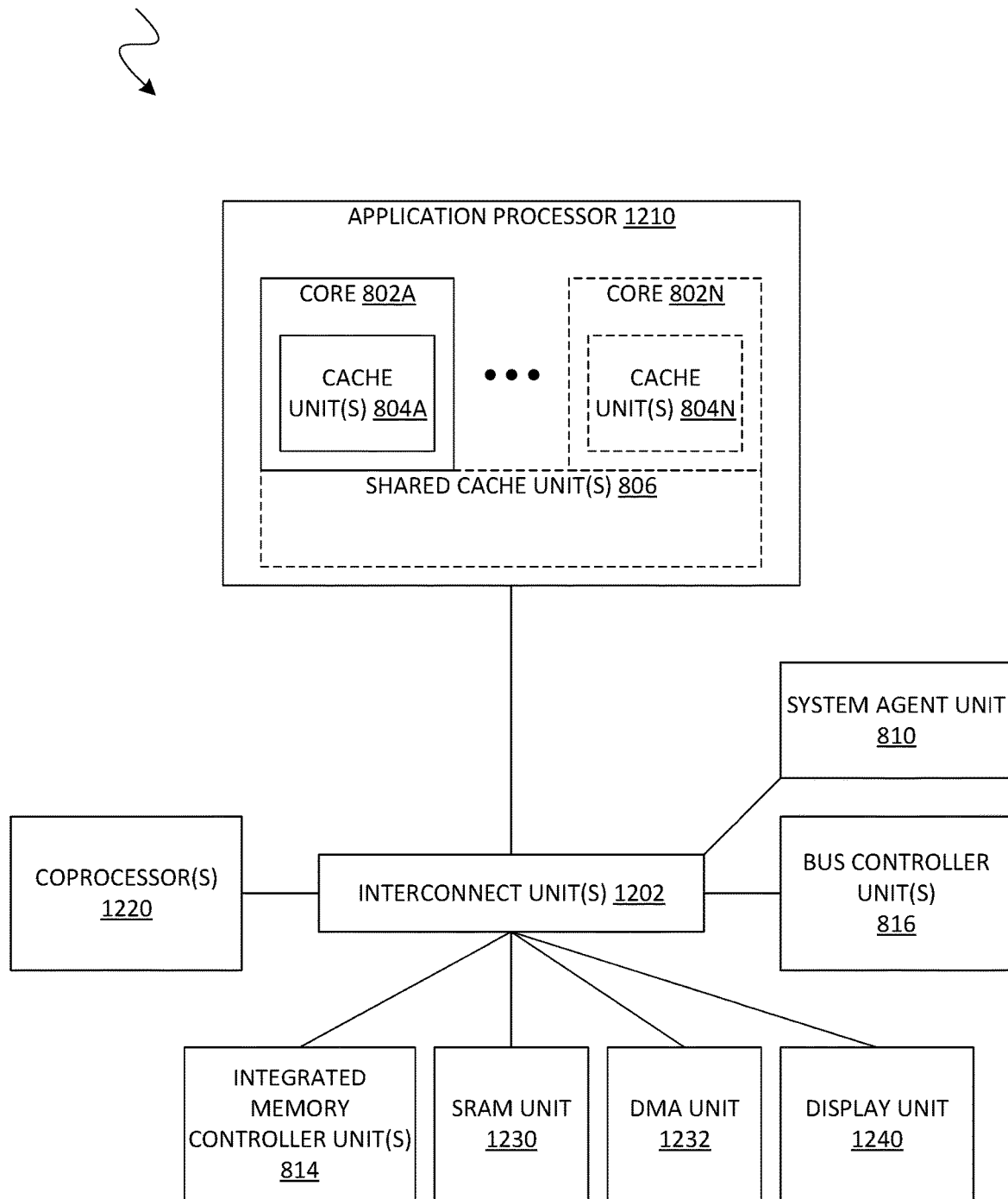

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 802A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
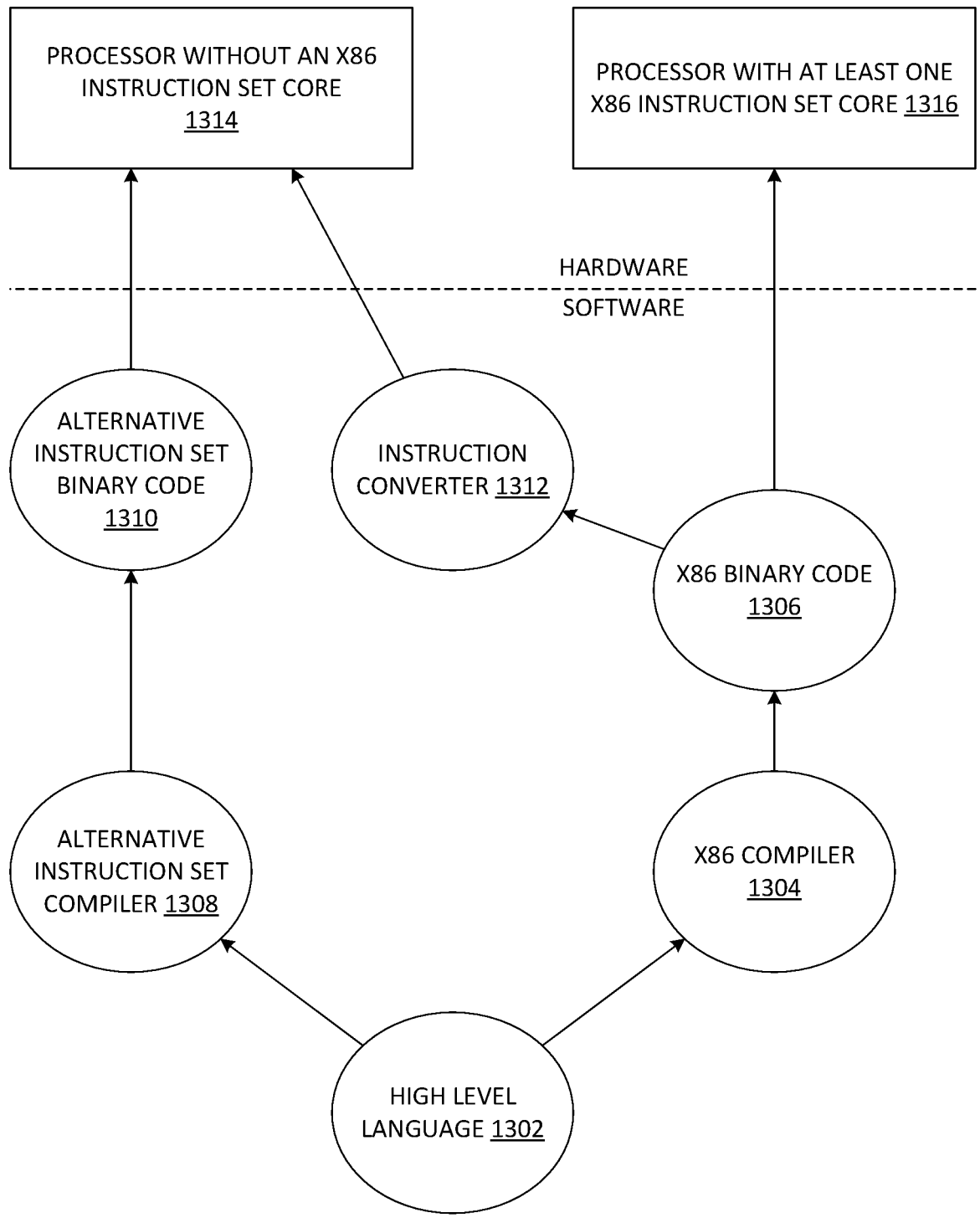
FIG. 13 is a block diagram contrasting the use of a software instruction converter to convert binary instructions in a source instruction set to binary instructions in a target instruction set according to an embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, CA and/or that execute the ARM instruction set of ARM Holdings of Sunnyvale, CA). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Techniques and architectures for facilitating a machine check functionality of a processor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, one or more non-transitory computer-readable storage media have stored thereon instructions to cause a processor to perform a method comprising executing first firmware code to provide a machine check event (MCE) detector, wherein the MCE detector is to detect a hardware error, access first information from an architectural register of the processor, wherein the first information identifies a location of second firmware code in a memory, and generate a call, based on both the hardware error and the first information, to invoke an MCE handler, wherein, based on the call, the second firmware code is executed to provide the MCE handler, wherein the MCE handler performs an attempt to recover from the hardware error.

In one or more second embodiments, further to the first embodiment, the MCE detector is to invoke the MCE handler independent of any generation of a system management interrupt based on the hardware error.

In one or more third embodiments, further to the first embodiment or the second embodiment, the MCE handler is further to generate second information which indicates whether the attempt was successful, and wherein, after a return from the MCE handler, the MCE detector is further to determine, based on the second information, whether to invoke a second MCE handler of an operating system.

In one or more fourth embodiments, further to any of the first through third embodiments, the method further comprises with a basic input output system (BIOS), loading the second firmware code to the location, and with the BIOS, storing the first information to the architectural register of the processor.

In one or more fifth embodiments, further to any of the first through fourth embodiments, the MCE handler is a single threaded process.

In one or more sixth embodiments, further to any of the first through fifth embodiments, the MCE handler is a ring 0 process.

In one or more seventh embodiments, further to any of the first through sixth embodiments, the method further comprises providing an interface between an operating system executed with the processor, and one of the MCE detector or the MCE handler, wherein the interface is compatible with a Unified Extensible Firmware Interface standard, and authenticating the second firmware code with a Secure Boot feature of the interface.

In one or more eighth embodiments, further to any of the first through seventh embodiments, the MCE handler is to access one or more other architectural registers of the processor to identify a type of information to be included in a report of a machine check event.

In one or more ninth embodiments, further to the eighth embodiment, the MCE handler is to provide the report to a mailbox region of the memory.

In one or more tenth embodiments, a method at a processor comprises executing first firmware code to provide a machine check event (MCE) detector, wherein the MCE detector is to detect a hardware error, access first information from an architectural register of the processor, wherein the first information identifies a location of second firmware code in a memory, and generate a call, based on both the hardware error and the first information, to invoke an MCE handler, and based on the call, executing the second firmware code to provide the MCE handler, wherein the MCE handler performs an attempt to recover from the hardware error.

In one or more eleventh embodiments, further to the tenth embodiment, the MCE detector is to invoke the MCE handler independent of any generation of a system management interrupt based on the hardware error.

In one or more twelfth embodiments, further to the tenth embodiment or the eleventh embodiment, the MCE handler is further to generate second information which indicates whether the attempt was successful, and wherein, after a return from the executing of the second firmware code, the MCE detector is further to determine, based on the second information, whether to invoke a second MCE handler of an operating system.

In one or more thirteenth embodiments, further to any of the tenth through twelfth embodiments, the method further comprises with a basic input output system (BIOS), loading the second firmware code to the location, and with the BIOS, storing the first information to the architectural register of the processor.

In one or more fourteenth embodiments, further to any of the tenth through thirteenth embodiments, the MCE handler is a single threaded process.

In one or more fifteenth embodiments, further to any of the tenth through fourteenth embodiments, the MCE handler is a ring 0 process.

In one or more sixteenth embodiments, further to any of the tenth through fifteenth embodiments, the method further comprises providing an interface between an operating system executed with the processor, and one of the MCE detector or the MCE handler, wherein the interface is compatible with a Unified Extensible Firmware Interface standard, and authenticating the second firmware code with a Secure Boot feature of the interface.

In one or more seventeenth embodiments, further to any of the tenth through sixteenth embodiments, the MCE handler is to access one or more other architectural registers of the processor to identify a type of information to be included in a report of a machine check event.

In one or more eighteenth embodiments, further to the seventeenth embodiment, the MCE handler is to provide the report to a mailbox region of the memory.

In one or more nineteenth embodiments, one or more non-transitory computer-readable storage media have stored thereon instructions to cause a processor to perform a method comprising with a basic input output system (BIOS), loading first firmware code to a location in a memory, and with the BIOS, storing first information to an architectural register of a processor which is coupled to the memory, wherein the first information identifies the location, wherein the architectural register is to be accessible to a hardware error detector which is to be provided with second firmware code, wherein an execution of the second firmware code is to provide a machine check event (MCE) detector, wherein the MCE detector is to detect a hardware error, access the first information at the architectural register, and generate a call, based on both the hardware error and the first information, to invoke an MCE handler, and wherein, based on the call, the first firmware code is to be executed to provide the MCE handler, wherein the MCE handler is to perform an attempt to recover from the hardware error.

In one or more twentieth embodiments, further to the nineteenth embodiment, the MCE detector is to invoke the MCE handler independent of any generation of a system management interrupt based on the hardware error.

In one or more twenty-first embodiments, further to the nineteenth embodiment or the twentieth embodiment, the MCE handler is further to generate second information which indicates whether the attempt was successful, and wherein, after a return from the executing of the second firmware code, the MCE detector is further to determine, based on the second information, whether to invoke a second MCE handler of an operating system.

In one or more twenty-second embodiments, further to any of the nineteenth through twenty-first embodiments, the MCE handler is a single threaded process.

In one or more twenty-third embodiments, further to any of the nineteenth through twenty-second embodiments, the MCE handler is a ring 0 process.

In one or more twenty-fourth embodiments, further to any of the nineteenth through twenty-third embodiments, the method further comprises providing an interface between an operating system executed with the processor, and one of the MCE detector or the MCE handler, wherein the interface is compatible with a Unified Extensible Firmware Interface standard, and authenticating the second firmware code with a Secure Boot feature of the interface.

In one or more twenty-fifth embodiments, further to any of the nineteenth through twenty-fourth embodiments, the MCE handler is to access one or more other architectural registers of the processor to identify a type of information to be included in a report of a machine check event.

In one or more twenty-sixth embodiments, further to the twenty-fifth embodiment, the MCE handler is to provide the report to a mailbox region of the memory.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. One or more non-transitory computer-readable storage media having stored thereon instructions to cause a processor to perform a method comprising:
    executing first firmware code to provide a machine check event (MCE) detector, wherein the MCE detector is to:
        detect a hardware error;
        access first information from an architectural register of the processor, wherein the first information identifies a location of second firmware code in a memory; and
        generate a call, based on both the hardware error and the first information, to invoke an MCE handler;
    wherein, based on the call, the second firmware code is executed to provide the MCE handler, wherein the MCE handler performs an attempt to recover from the hardware error.

2. The one or more non-transitory computer-readable storage media of claim 1, wherein the MCE detector is to invoke the MCE handler independent of any generation of a system management interrupt based on the hardware error.

3. The one or more non-transitory computer-readable storage media of claim 1, wherein the MCE handler is further to generate second information which indicates whether the attempt was successful; and
    wherein, after a return from the MCE handler, the MCE detector is further to determine, based on the second information, whether to invoke a second MCE handler of an operating system.

4. The one or more non-transitory computer-readable storage media of claim 1, the method further comprising:
    with a basic input output system (BIOS), loading the second firmware code to the location; and
    with the BIOS, storing the first information to the architectural register of the processor.

5. The one or more non-transitory computer-readable storage media of claim 1, wherein the MCE handler is a single threaded process.

6. The one or more non-transitory computer-readable storage media of claim 1, wherein the MCE handler is a ring 0 process.

7. The one or more non-transitory computer-readable storage media of claim 1, the method further comprising:
    providing an interface between an operating system executed with the processor, and one of the MCE detector or the MCE handler, wherein the interface is compatible with a Unified Extensible Firmware Interface standard; and
    authenticating the second firmware code with a Secure Boot feature of the interface.

8. The one or more non-transitory computer-readable storage media of claim 1, wherein the MCE handler is to access one or more other architectural registers of the processor to identify a type of information to be included in a report of a machine check event.

9. The one or more non-transitory computer-readable storage media of claim 8, wherein the MCE handler is to provide the report to a mailbox region of the memory.

10. A method at a processor, the method comprising:
    executing first firmware code to provide a machine check event (MCE) detector, wherein the MCE detector is to:
        detect a hardware error;
        access first information from an architectural register of the processor, wherein the first information identifies a location of second firmware code in a memory; and
        generate a call, based on both the hardware error and the first information, to invoke an MCE handler; and
    based on the call, executing the second firmware code to provide the MCE handler, wherein the MCE handler performs an attempt to recover from the hardware error.

11. The method of claim 10, wherein the MCE detector is to invoke the MCE handler independent of any generation of a system management interrupt based on the hardware error.

12. The method of claim 10, wherein the MCE handler is further to generate second information which indicates whether the attempt was successful; and
    wherein, after a return from the executing of the second firmware code, the MCE detector is further to determine, based on the second information, whether to invoke a second MCE handler of an operating system.

13. The method of claim 10, further comprising:
with a basic input output system (BIOS), loading the second firmware code to the location; and
with the BIOS, storing the first information to the architectural register of the processor.

14. The method of claim 10, wherein the MCE handler is a single threaded process.

15. The method of claim 10, wherein the MCE handler is a ring 0 process.

16. One or more non-transitory computer-readable storage media having stored thereon instructions to cause a processor to perform a method comprising:
with a basic input output system (BIOS), loading first firmware code to a location in a memory; and
with the BIOS, storing first information to an architectural register of the processor, wherein the first information identifies the location, wherein the architectural register is to be accessible to a hardware error detector which is to be provided with second firmware code;
wherein an execution of the second firmware code is to provide a machine check event (MCE) detector, wherein the MCE detector is to:
detect a hardware error;
access the first information at the architectural register; and
generate a call, based on both the hardware error and the first information, to invoke an MCE handler; and
wherein, based on the call, the first firmware code is to be executed to provide the MCE handler, wherein the MCE handler is to perform an attempt to recover from the hardware error.

17. The one or more non-transitory computer-readable storage media of claim 16, wherein the MCE detector is to invoke the MCE handler independent of any generation of a system management interrupt based on the hardware error.

18. The one or more non-transitory computer-readable storage media of claim 16, wherein the MCE handler is further to generate second information which indicates whether the attempt was successful; and
wherein, after a return from the executing of the second firmware code, the MCE detector is further to determine, based on the second information, whether to invoke a second MCE handler of an operating system.

19. The one or more non-transitory computer-readable storage media of claim 16, wherein the MCE handler is a single threaded process.

20. The one or more non-transitory computer-readable storage media of claim 16, wherein the MCE handler is a ring 0 process.

* * * * *